United States Patent
Froeschl et al.

(10) Patent No.: US 10,647,327 B2
(45) Date of Patent: May 12, 2020

(54) METHOD AND DEVICES FOR SPECIFYING AN OPERATING STRATEGY PROFILE

(71) Applicant: Bayerische Motoren Werke Aktiengesellschaft, Munich (DE)

(72) Inventors: Joachim Froeschl, Herrsching (DE); Martin Hattenkofer, Oberschneiding (DE); Christian Pichler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 4 days.

(21) Appl. No.: 16/104,208

(22) Filed: Aug. 17, 2018

(65) Prior Publication Data

US 2019/0054925 A1 Feb. 21, 2019

(30) Foreign Application Priority Data

Aug. 18, 2017 (DE) .......................... 10 2017 214 384

(51) Int. Cl.
*B60W 50/00* (2006.01)
*G01C 21/26* (2006.01)
(Continued)

(52) U.S. Cl.
CPC ........ *B60W 50/0098* (2013.01); *B60W 40/09* (2013.01); *G01C 21/26* (2013.01);
(Continued)

(58) Field of Classification Search
CPC ....... B60W 2540/30; B60W 2550/402; B60W 40/09; B60W 50/0098; G01C 21/26; G01C 21/3461; G01C 21/3469; G01C 21/3484
See application file for complete search history.

(56) References Cited

U.S. PATENT DOCUMENTS

| 7,013,205 B1 * | 3/2006 | Hafner | B60W 10/08 701/22 |
| 8,676,442 B2 * | 3/2014 | Lynar | B60W 50/16 701/41 |

(Continued)

FOREIGN PATENT DOCUMENTS

| DE | 10 2011 078 271 A1 | 1/2013 |
| DE | 10 2014 008 380 A1 | 12/2014 |

(Continued)

OTHER PUBLICATIONS

German-language Search Report issued in counterpart German Application No. 10 2017 214 384.3 dated Jun. 22, 2018 with partial English translation (11 pages).

*Primary Examiner* — Babar Sarwar
(74) *Attorney, Agent, or Firm* — Crowell & Moring LLP (57) ABSTRACT

A method and a device for specifying an operating strategy profile for the operation of a motor vehicle, and a method and a central database device for specifying a global geo-referenced operating strategy profile with regard to a driving route are provided. The following steps are executed: transmitting driving route data that characterize a scheduled driving route for an upcoming journey of the vehicle to a central database device; receiving operating strategy data from the central database device, which data characterize a proposed geo-referenced global operating strategy profile defined with respect to the driving route for the operation of the vehicle during its journey on the driving route; sensor-based acquisition of operating data that characterize an operating status and/or a driving situation of the vehicle during its journey on the driving route, and determining a local operating strategy profile for the operation of the vehicle during its continued journey on the driving route on the basis of the acquired operating data; specification of an operating strategy profile to be applied for the operation of (Continued)

the vehicle on the basis of the global operating strategy profile and the local operating strategy profile; and application of the specified operating strategy profile for the operation of the vehicle on the driving route.

16 Claims, 3 Drawing Sheets

(51) Int. Cl.
    *B60W 40/09*     (2012.01)
    *G01C 21/34*     (2006.01)

(52) U.S. Cl.
    CPC ..... *G01C 21/3461* (2013.01); *G01C 21/3469* (2013.01); *G01C 21/3484* (2013.01); *B60W 2540/30* (2013.01); *B60W 2556/50* (2020.02)

(56) References Cited

U.S. PATENT DOCUMENTS

| | | | | |
|---|---|---|---|---|
| 9,187,091 | B2* | 11/2015 | Mills | B60W 40/107 |
| 9,663,048 | B2* | 5/2017 | Pichler | B60W 50/0098 |
| 2003/0078699 | A1* | 4/2003 | Harms | B60R 16/0315 |
| | | | | 701/1 |
| 2004/0230374 | A1* | 11/2004 | Tzamaloukas | G01C 21/28 |
| | | | | 701/495 |
| 2006/0122741 | A1* | 6/2006 | Bassiere | G06F 9/4806 |
| | | | | 701/1 |
| 2007/0083326 | A1* | 4/2007 | Johnson | G08G 1/096811 |
| | | | | 701/420 |
| 2011/0166731 | A1* | 7/2011 | Kristinsson | B60W 10/08 |
| | | | | 701/22 |
| 2012/0078496 | A1* | 3/2012 | Lindhuber | B60K 35/00 |
| | | | | 701/123 |
| 2013/0116870 | A1* | 5/2013 | Harty | B60W 20/12 |
| | | | | 701/22 |
| 2013/0151088 | A1* | 6/2013 | Ricci | G06F 17/00 |
| | | | | 701/51 |
| 2013/0204524 | A1* | 8/2013 | Fryer | G01C 21/3407 |
| | | | | 701/527 |
| 2014/0022108 | A1* | 1/2014 | Alberth, Jr. | G01S 13/931 |
| | | | | 342/52 |
| 2014/0114498 | A1* | 4/2014 | Pichler | B60W 50/0098 |
| | | | | 701/1 |
| 2014/0277835 | A1* | 9/2014 | Filev | G01C 21/3469 |
| | | | | 701/2 |
| 2018/0170290 | A1* | 6/2018 | Flemmer | B60R 16/0236 |
| 2018/0354489 | A1* | 12/2018 | Stayton | B60W 10/20 |
| 2019/0004517 | A1* | 1/2019 | Xia | G05D 1/0274 |
| 2019/0294167 | A1* | 9/2019 | Kutila | G05D 1/0231 |

FOREIGN PATENT DOCUMENTS

| | | |
|---|---|---|
| DE | 10 2014 205 252 A1 | 9/2015 |
| DE | 10 2017 000 750 A1 | 7/2017 |

* cited by examiner

METHOD AND DEVICES FOR SPECIFYING AN OPERATING STRATEGY PROFILE

CROSS REFERENCE TO RELATED APPLICATION

This application claims priority under 35 U.S.C. § 119 from German Patent Application No. 10 2017 214 384.3, filed Aug. 18, 2017, the entire disclosure of which is herein expressly incorporated by reference.

BACKGROUND AND SUMMARY OF THE INVENTION

The invention relates to a method and a device for specifying an operating strategy profile for the operation of a vehicle, in particular a motor vehicle, which can be implemented in the vehicle, and to a vehicle equipped with this device as well as a method and a central database device for specifying a global geo-referenced operating strategy profile with regard to a driving route.

Modern vehicles often contain control systems, which enable the operation of a vehicle in accordance with a predefined strategy. These allow vehicles to be driven with particularly low emissions or in a particularly powerful manner. In particular, it is possible to develop such strategies such that they are dependent on the driving route. These strategies are preferably optimized on the basis of empirically obtained data, which are acquired by monitoring and analyzing the behavior of a plurality of vehicles on a given driving route.

From document DE 10 2011 078 271 A1 it is known how one or more function input variables can be determined dependent on at least one operating parameter and on the basis of the function input variables and a pre-defined set of rules, how one or more output variables can be determined that characterize an operating strategy from a pre-defined set of operating strategies.

Document DE 10 2014 008 380 A1 discloses how a route-dependent driving behavior of a driver of a vehicle can be determined and how, on the basis of the driving behavior and route-related information, a driver request or the future driving behavior can be predicted, allowing an operating strategy to be selected and/or prepared according to the driver.

An object of the invention is to provide a vehicle with an operating strategy profile that is optimized for a road to be driven.

This object is achieved by methods and devices in accordance with embodiments of the invention.

A first aspect of the invention relates to a method for specifying an operating strategy profile for the operation of a vehicle, in particular of a motor vehicle, which can be implemented in the vehicle, comprising: (i) transmitting driving route data that characterize a scheduled driving route for an upcoming journey of the vehicle to a central database device; (ii) receiving operating strategy data from the central database device, which data characterize a proposed geo-referenced global operating strategy profile defined with respect to the driving route for the operation of the vehicle during its journey on the driving route; (iii) sensor-based acquisition of operating data that characterize an operating status and/or a driving situation of the vehicle during its journey on the driving route, and determining a local operating strategy profile for the operation of the vehicle during its continued journey on the driving route on the basis of the acquired operating data; (iv) specification of an operating strategy profile to be applied for the operation of the vehicle during its continued journey on the driving route on the basis of the global operating strategy profile and the local operating strategy profile; and (v) application of the specified operating strategy profile for the operation of the vehicle on the driving route.

An "operating strategy profile" within the meaning of the invention is understood in particular to mean one or a set of a plurality of operating strategies, according to which a vehicle can be operated while being driven on the driving route. In the extreme case, the operating strategy profile may contain only one operating strategy, according to which the vehicle can be operated along the entire driving route. The operating strategy profile preferably contains a plurality of operating strategies, in particular optimized in relation to the different route sections of the driving route, according to which the vehicle can be operated section-by-section along the driving route.

An "operating strategy" within the meaning of the invention is understood to mean in particular the operation of a vehicle according to one or more predetermined rules, in particular from a pre-defined set of rules. In particular, on the basis of an operating strategy the vehicle can be operated in such a manner that a parameter, such as a pollutant emission, energy consumption, power output and/or the like, can be optimized, in particular minimized or maximized. Alternatively or additionally, on the basis of an operating strategy, the vehicle can be operated to take into account one or more specified parameters, such as the generation of a specified on-board power supply voltage of the vehicle by a generator of the vehicle. In other words, an operating strategy can be specified such that one or more components of the vehicle are used in a manner specified in each case.

By determining the operating strategy profile to be applied on the route on the basis of the global and local operating strategy profile, one or more operating strategies can be followed, which in terms of the operation of the vehicle on the route have proved particularly advantageous and/or which take account of situation-dependent conditions, such as vehicle loading, traffic situation, changing weather, vehicle condition (e.g. tire condition, engine condition and/or similar), driver attitude (e.g. sporty, defensive and/or similar) and/or similar conditions. In particular, this allows tuning of the operating strategy profile to be applied to the route to be driven in a fine-grained and/or predictive manner.

In particular, on the basis of the determined operating strategy profile to be applied it is possible in an optimized way, i.e. matched to the driving route taken or to be driven by the vehicle, in particular to a section of the driving route ahead of the vehicle, a driver's request and/or a driving behavior of the driver, to limit a power output, in particular a maximum velocity and/or acceleration of the vehicle, to suspend a throttling of the engine of the vehicle, to activate a specified driver assistance mode of the vehicle and/or to control the energy supply of electrical components of the vehicle. This allows an increase in efficiency, in particular a reduction of the energy consumption, of the vehicle thus operated and/or an increase in comfort or satisfaction of vehicle occupants, particularly of the driver, of the vehicle thus operated.

Overall, the invention enables an operating strategy profile to be provided which is optimized for a road to be driven.

In a preferred embodiment, the operating strategy profile to be applied is specified by selection of the global or the local operating strategy profile on the basis of a selection criterion. In this case, the selection criterion is preferably formed by one or more predefined parameter threshold values of operating parameters of the vehicle, wherein the selection criterion is fulfilled if the corresponding operating parameters reach the predefined parameter thresholds and/or, depending on the application, exceed or undershoot them. The parameter threshold values can be defined in particular depending on the route to be driven, in particular on a route section of the driving route located ahead of the vehicle, on a driver request and/or a driving behavior of the driver. As a result, the vehicle can be operated with the particular operating strategy profile that enables a better operation in terms of the selection criterion. In particular, the specification of the operating strategy profile to be applied by selection on the basis of the selection criterion enables the specification and/or consideration of one or more operating parameters that were not input into the local or global operating strategy profile, or only partially.

In a further preferred embodiment, the selection criterion is based on the optimization of one of the following or a combination of at least two of the following: (i) energy consumption of the vehicle; (ii) power of the vehicle; (iii) comfort of vehicle occupants; (iv) vehicle safety; and/or (v) a cost function, into which the operating strategy data of the global and/or local operating strategy profile are entered. Preferably, when determining the operating strategy profile to be applied, the local operating strategy profile is compared with the global operating strategy profile with respect to at least one of the above-mentioned points (i) to (v), and the operating strategy profile selected is that which enables an improved operation of the vehicle in terms of at least one point pre-selected from points (i) to (v) on the driving route being driven or to be driven, in particular in a route section of the driving route located ahead of the vehicle, according to a driver request and/or in accordance with a driving behavior of the driver of the vehicle. This allows the operation of the vehicle, in particular in relation to the driver's wishes and/or in accordance with the driving behavior of the driver of the vehicle, to be optimized in a flexible way.

In a further preferred embodiment the operating strategy profile to be applied is specified by combination of the global with the local operating strategy profile using one of the following procedures or a combination of at least two of the following: (i) averaging of operating strategy data of the global and local operating strategy profile; (ii) section-by-section selection of either the global or the local operating strategy profile for a particular section of the operating strategy profile; and/or (iii) adjusting, in particular limiting, of the global operating strategy profile on the basis of the local operating strategy profile.

Due to the averaging of operating strategy data of the local and the global operating strategy profile a compromise can be reached with regard to the operation of the vehicle, which allows for both operating parameters optimized on the basis of experience values, which were obtained from other vehicles on the route driven by the vehicle, and operating parameter values currently differing from the experience values, possibly only in one section of the driving route.

By the section-by-section selection of either the global or the local operating strategy profile for a particular section of the operating strategy profile it is possible, for instance on individual sections of the route, for the vehicle to be operated on the basis of the operating strategy profile that enables an improved operation of the vehicle, at least temporarily, compared to the other operating strategy profile. This therefore enables a particularly fine-grained operating strategy profile to be applied.

By the adjustment, in particular limiting, of the global operating strategy profile on the basis of the local operating strategy profile, the vehicle can be operated using operating parameters that have been optimized based on experience values obtained from other vehicles on the route driven by the vehicle. In this approach however, the operating strategy data of the local operating strategy profile restrict the values that the operating parameters can assume. As a result, the vehicle can be prevented from being operated in a manner that would be disadvantageous for a current unforeseeable driving situation or a current unforeseeable operating status of the vehicle.

The phrase "restricting the global operating strategy profile on the basis of the local operating strategy profile" is understood within the meaning of the invention in particular to mean the modification, in particular adaptation, of operating strategy data that characterize the global operating strategy on the basis of, in particular, operating strategy data that characterize the local operating strategy profile. Thus, for instance, operating parameter values to be applied to the operation of the vehicle in accordance with the global operating strategy profile can be replaced or at least modified, in particular in accordance with a prescribed calculation rule, by operating parameter values to be applied to the operation of the vehicle in accordance with the local operating strategy profile.

In a further preferred embodiment, the operating strategy profile to be applied is adapted using at least one predetermined route-independent operating strategy limit. Preferably, this restriction is chosen in such a way that as a result an "unstable state" which might otherwise not be excluded by the application of the operating strategy profile is avoided, and in which the function of one or more components of the vehicle or of their interaction is impaired. In this case, the route-independent operating strategy limit can contain, in particular, prescribed operating parameter limits, which limit or replace corresponding operating parameter values that would be to be applied in accordance with the operating strategy profile to be applied. This results in a reliable operation of the vehicle.

In a further preferred embodiment, an energy management of one or more of the electrical consumers on the vehicle is performed in accordance with the operating strategy profile to be applied. In particular, a power output of an electric motor of the vehicle and/or an energy recuperation, such as the switching of the electric motor into a generator mode, can be controlled on the basis of the operating strategy profile to be applied. This enables the efficiency of the vehicle to be increased.

In a further preferred embodiment, operating strategy data that characterize the applied operating strategy profile are transmitted to the central database device together with a position of the vehicle. This allows the database device to determine the global operating strategy profile on the basis of the transmitted operating strategy data and the position of the vehicle, or at least to modify, in particular optimize it. As a result, the global operating strategy profile can be improved, in particular adapted to specific driving routes.

A second aspect of the invention relates to a device for specifying an operating strategy profile for the operation of a vehicle, in particular a motor vehicle, in the motor vehicle that is configured to execute the method according to the first aspect of the invention.

A third aspect of the invention relates to a vehicle, in particular a motor vehicle, having a device according to the second aspect of the invention.

A fourth aspect of the invention relates to a method for specifying a global geo-referenced operating strategy profile with respect to a driving route, comprising (i) reception from a vehicle, of positions of the vehicle along a driving route driven by the vehicle or of driving route data that characterize the route driven by the vehicle, and of operating data that characterize an operating status of the vehicle or a driving situation during its journey on the driving route, and/or of operating strategy data that characterize an operating strategy profile of the vehicle applied during its journey on the driving route, from a central database; (ii) specification of a global operating strategy profile for this driving route on the basis of the received positions of the vehicle or of the route data and the operating data and the operating strategy data; (iii) reception from at least one additional vehicle, of driving route data that characterize the route driven by the vehicle; (iv) transmission of the identified global operating strategy profile to the at least one additional vehicle; and (v) iterative execution of the method, by virtue of operating data that characterize an operating status of the at least one additional vehicle or a driving situation during the journey of the at least one additional vehicle on the driving route, and/or operating strategy data that characterize an operating strategy profile of the at least one other vehicle applied during its journey on the driving route, being received from the central database device and by the global operating strategy profile for this route being specified afresh on the basis of the operating data and/or the operating strategy data for the route that is driven and the previously identified global operating strategy.

Preferably, during the iterative execution of the method the global operating strategy profile is modified on the basis of the operating data and/or operating strategy data transmitted from the additional vehicle, and in particular is adapted to the transmitted operating data and/or operating strategy data.

On the basis of operating data and/or operating strategy data of an operating strategy profile to be applied of a vehicle that is driving or has driven along the route, a global operating strategy profile which is optimized in particular with regard to the route being driven can therefore be specified, that can be used by one or more vehicles to determine an operating strategy profile to be applied, in particular taking into account a local operating strategy profile.

The iterative implementation of the method allows an improvement of the specified global operating strategy profile, and/or the specification of an improved global operating strategy profile, in particular an adaptation to the route being driven. In particular, by means of the iterative implementation a dynamic optimization of the global operating strategy profile can be achieved, in which the global operating strategy profile can be adapted essentially continuously to boundary conditions which may be changing, in particular in the medium and long term, and which could adversely affect the optimized operation of a vehicle on the route or at least on sections thereof. As a result, different seasonal or time-of-day dependent operating strategy profiles can be specified, for instance for summer or winter or during the occurrence of rush-hour traffic.

In a preferred embodiment, the global operating strategy profile identified is stored as a component, in particular not graphically displayed, of an electronic navigation map. Individual route sections on the electronic navigation map can be assigned different global operating strategy profiles. When transmitting the driving route data from the vehicle to the central database device the position of the vehicle is preferably also transmitted. On the basis of the position of the vehicle, on the electronic navigation map a route driven by the vehicle, in particular a section of the route driven, can be determined and the corresponding global operating strategy profile can be accessed. Therefore, the vehicle can be reliably provided with an optimized global operating strategy profile in relation to the route driven or to be driven by the vehicle, in particular a section of the driving route located ahead of the vehicle.

In a further preferred embodiment, the received operating data and/or operating strategy data contain a parameter that identifies a vehicle category of the transmitting vehicle. Preferably, the global operating strategy profile is specified as a function of the vehicle class. Thus, for example, for the same route a different global operating strategy profile can be determined and made available for a small car, in particular one with low engine power, than for a sports car, in particular one with high engine power. The matching of the global operating strategy profile to the vehicle class allows an operation of the vehicle which is particularly well matched to the vehicle/driving route combination.

In a further preferred embodiment, in the iterative execution of the method differences between an operating strategy profile obtained from the received operating data of the additional vehicle and/or the applied operating strategy profile on the one hand, and the previously identified global operating strategy profile on the other hand, are classified. The global operating strategy profile is preferably specified, in particular adapted, taking into account the classified differences. In particular, different global operating strategy profiles can be determined for different classifications. If a plurality of operating strategy profiles is available, then those which show only minor deviations among themselves and therefore in relation to the global operating strategy profile belong to the same class, can be averaged, which simplifies the determination of the global operating strategy profile.

A fifth aspect of the invention relates to a central database device, in particular a server with a data base, which is configured to execute the method according to the fourth aspect of the invention. Preferably, the central database device comprises a processing device for this purpose.

The features and advantages described in relation to the first aspect of the invention and its advantageous design also apply, where technically feasible, to the second, third, fourth and fifth aspect of the invention and its advantageous design, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
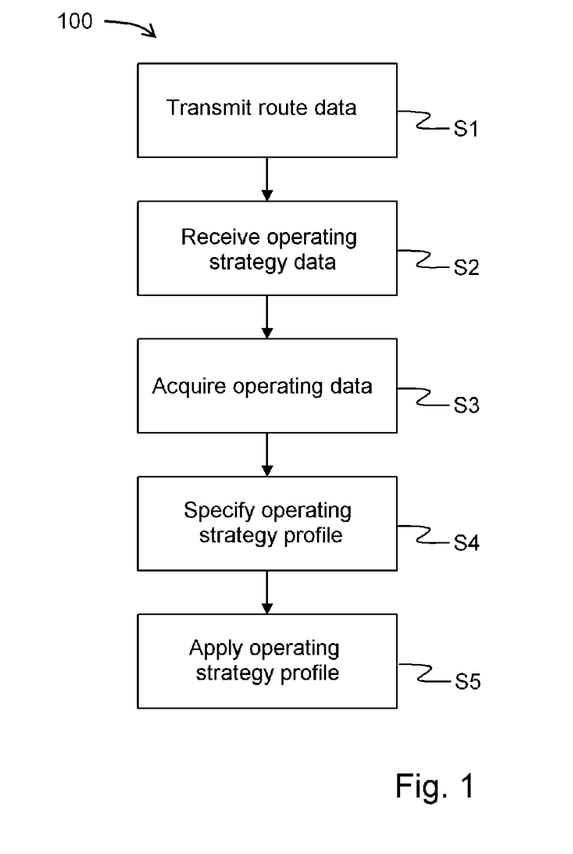
FIG. 1 is a flow chart of an exemplary embodiment of a method for specifying an operating strategy profile for the operation of a vehicle, which can be executed in the vehicle.

FIG. 1 shows an exemplary embodiment of a method 100 for specifying an operating strategy profile for the operation of a vehicle, which can be executed in the relevant vehicle.

In one method step S1, for example via a wireless communication link, driving route data are transmitted from the vehicle to a central database device. Preferably, these route data characterize a driving route, which is currently being driven or will be driven by the vehicle in the near future. In particular, the driving route data can also characterize a section of the route on the route ahead of the vehicle. Alternatively or in addition, the route data can also contain a current position of the vehicle, acquired in particular by means of sensors, on the basis of which it is possible to determine, in particular using the central database device, on which driving route the vehicle is currently located, in particular in or before which section of the route. This can be carried out using an electronic navigation map, for instance.

The central database device is preferably configured to determine, for instance to load from a memory device, a global operating strategy profile as a function of the transmitted driving route data and/or the current position of the vehicle, in accordance with which the vehicle can be advantageously operated on the route, in particular a section of the route.

Since the operating strategy profile determined depends on the driving route data and/or the position of the vehicle, in this context it is also referred to as a geo-referenced operating strategy profile.

In a further method step S2, operating strategy data that characterize the geo-referenced global operating strategy profile are transmitted to the vehicle from the central database device. The geo-referenced global operating strategy profile preferably forms a recommended operating strategy profile for the vehicle in relation to the driving route being driven or to be driven by the vehicle, which particularly in relation to one or more operating parameters of the vehicle can correspond to an optimized operating strategy profile, and which in a preferred manner is based on an evaluation of operating data from a plurality of vehicles on this driving route.

In a still further step S3, operating data that characterize an operating state and/or a driving situation of the vehicle during its journey on the route are acquired by use of sensors. An operating state can be characterized by a load, a speed, an acceleration, a power output, an engine speed and/or by other operating parameters, in particular ones that can be read out from an engine control unit of the vehicle. An operating state can be obtained in particular from a driving style of the driver of the vehicle. A driving situation can be characterized by the vehicle's surroundings, such as a traffic situation, a composition of a road surface, weather conditions and/or the like. Both the operating state and the driving situation can change depending on the driver, current position of the vehicle and/or the time at which the route is driven, and they therefore form variable boundary conditions for the operation of the vehicle.

Also included in method step S3, on the basis of the operating data, in particular a resulting operational status and/or any resulting driving situation, a local operating strategy profile is determined for the operation of the vehicle on the driving route, in particular in a section of the route currently being driven and/or located ahead of the vehicle.

In contrast to the global operating strategy profile, which preferably already exists for the entire route, in particular for all sections on the route, and preferably enables an operation of the vehicle that is optimized in relation to a plurality of operating strategies, such as an energy-saving and at the same time dynamic operation, the local operating strategy profile in general only exists for the section of the route currently being driven and preferably takes account of currently existing boundary conditions, in particular those changing rapidly, for the operation of the vehicle.

Therefore, using the global operating strategy profile the vehicle can be operated in a particularly predictive manner, i.e. the current operation of the vehicle can be adapted to a future operation of the vehicle, such as a still distant section of the driving route, while by means of the local operating strategy profile the vehicle can be operated in a very flexible way, i.e. optimally adapted to the currently prevailing conditions.

In a still further step S4, on the basis of the global operating strategy profile and of the local operating strategy profile, an operating strategy profile to be applied is determined, for example by selecting from the global or local operating strategy profile or by a combination of the global and local operating strategy profiles. Preferably, the operating strategy profile to be applied has properties of both the global and the local operating strategy profile, i.e. operating strategy data which characterize the operating strategy profile to be applied, preferably contain both operational strategy data of both the global operating strategy profile and the local operating strategy profile. As a result, the operating strategy profile to be applied can enable both a predictive as well as a flexible operation of the vehicle.

In a still further step S5, the vehicle is finally operated in accordance with the operating strategy profile to be applied that was determined in step S4.

Figure 2:
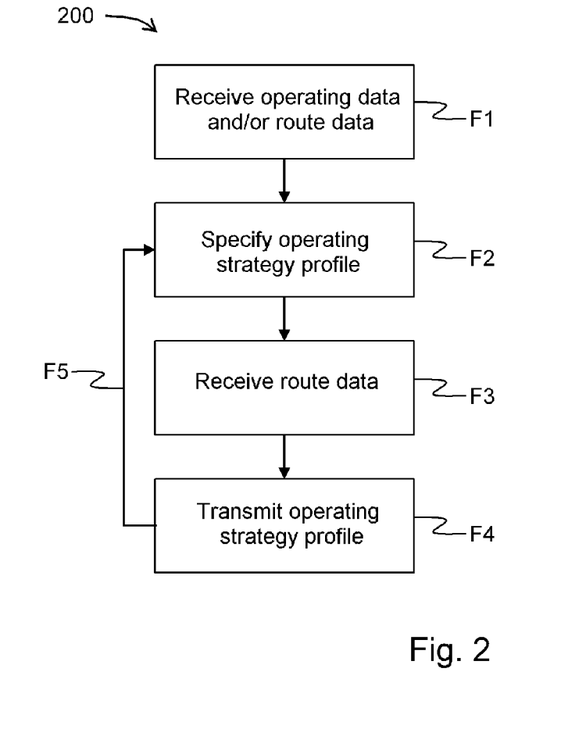
FIG. 2 is a flow chart of an exemplary embodiment of a method for specifying a global operating strategy profile.

FIG. 2 shows an exemplary embodiment of a method 200 for specifying a global operating strategy profile, in particular for a central database device.

In a specification step F1, positions of a vehicle along a route being driven by the vehicle, or driving route data that characterize the route driven by the vehicle, are transmitted from the vehicle to a central database device. In the same step operating data that characterize an operating status of the vehicle or a driving situation during its journey on the driving route, and from which an operating strategy profile can be determined in accordance with which the vehicle has been operated when driving on the route, are also transmitted from the vehicle to the central database device. Alternatively or additionally, operating strategy data that characterize the operating strategy profile applied while driving the vehicle on the route, can also be transmitted directly.

From these operating data and/or operating strategy data, in a further step F2, a global operating strategy profile is specified for the journey of the vehicle on the driving route characterized by the transmitted positions of the vehicle or the route data. Preferably, the specified global operating strategy profile is linked to the transmitted positions of the vehicle, in particular with sections being linked to sections of the route. As a result, a geo-referenced global operating strategy profile can be formed.

In a further specification step F3, the central database device receives driving route data that characterize the route driven by the vehicle and are sent from another vehicle, which is also driving on the route driven by the vehicle. If applicable, alternatively or in addition to the route data, the current position of the other vehicle can also be transmitted to the central database device, so that the driving route currently being driven by the other vehicle and already driven by the vehicle can be identified, in particular by the central database device and possibly taking into account an electronic navigation map.

In a further specification step F4, the previously determined global operating strategy profile is transmitted to the other vehicle, which is or can be then operated on the route or at least a section of the route, at least taking account of the global operating strategy transmitted. This allows the other vehicle to benefit from the operating data or operating strategy data of the vehicle previously driven on the driving route, collected in the central database device in the form of the global operating strategy profile, for example by using the operating strategy profile applied by the other vehicle and preferably based at least partially on the global operating strategy profile, to enable a predictive operation of the vehicle.

In a further specification step F5, operating data that characterize an operating status of the vehicle and/or a driving situation of the other vehicle along or on the route currently driven by the other vehicle and already driven by the vehicle, are transmitted by the other vehicle back to the central database device. Alternatively or in addition, operating strategy data that characterize the operating strategy profile applied by the other vehicle during its journey on the driving route are also transmitted.

The method 200 is then continued with the second specification step F2, wherein the global operating strategy profile is now specified on the basis of the latest operating data and/or operating strategy data transmitted by the other vehicle. Starting from the second specification step F2, the method 200 can then be executed iteratively.

Since the operating data and/or operating strategy data transmitted by the other vehicle is at least partially based on the previously specified global operating strategy profile transmitted to the other vehicle, or the operating data and/or operating strategy data transmitted by the additional vehicle at least partially depend on the previously specified global operating strategy profile transmitted to the additional vehicle, the global operating strategy profile now specified afresh in the iteration in the second definition step F2 differs from the previously specified global operating strategy profile. In particular, the previously specified global operating strategy profile can be modified, in particular adapted, taking into account the operating data and/or operating strategy data transmitted from the additional vehicle.

This is illustrated based on the following example: If the vehicle drives along the route, for instance without taking account of an operating strategy profile, the energy consumption of the vehicle can be suboptimal. On the basis of the operating data transmitted from the vehicle, in particular the energy consumption along the route, a global operating strategy profile for reducing the energy consumption can be specified. Another vehicle on the same route, which is operated in accordance with the global operating strategy profile, will therefore consume less energy, since it may be able to anticipate acceleration and/or braking operations. The operating data of the other vehicle transmitted to the central database device in this process can be used to further optimize the global operating strategy profile. This is possible in particular, since it is now known how, for example, the adaptation of the driving behavior of the other vehicle due to the global operating strategy profile impacts on the energy consumption.

Figure 3:
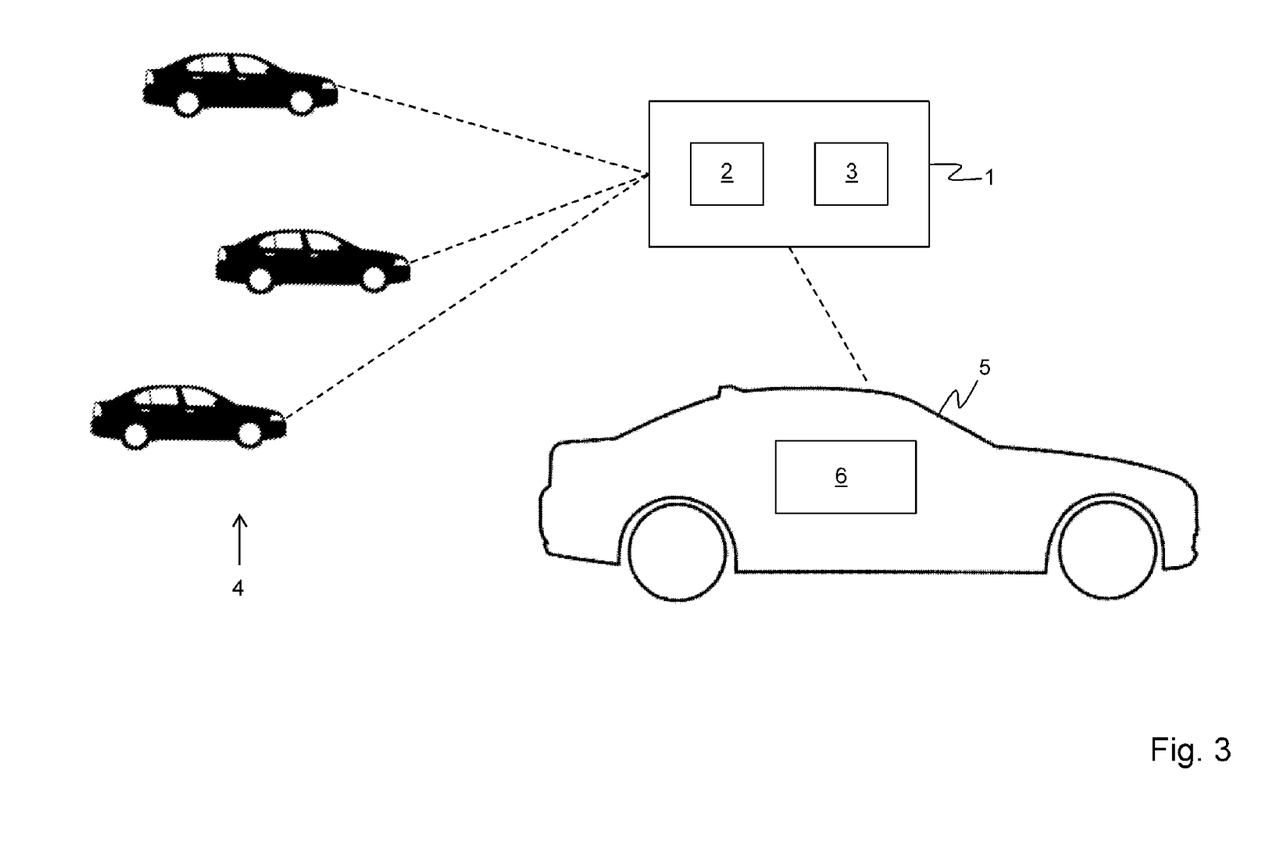
FIG. 3 is a schematic diagram of an exemplary embodiment of a central database device.

FIG. 3 shows an exemplary embodiment of a central database device 1 with a memory device 2 and a processing device 3, wherein the central database device 1 has a wireless communication link to a vehicle fleet 4.

The vehicles in the vehicle fleet 4 transmit operating data, such as their energy consumption, their engine speed, a pedal position of the gas pedal and/or the like, to the central database device 1 when driving along a route. By means of the processing device 3 an average value can be formed for each of the different operating parameters from the operating data. In particular, by means of the processing device 3, a difference between a value of an operating parameter contained in the operating data and the corresponding calculated average value is determined and classified. In particular, for instance a fuel consumption can be classified as slightly, moderately or far above or below the average fuel consumption on the route.

The values of the operating parameters within the classes formed in this way are preferably averaged and stored in the memory device 2, preferably in conjunction with an electronic navigation map, for example as an additional map layer. Depending on the different classes and/or classified average values, a global operating strategy profile can be defined.

The global operating strategy profile can be defined both in relation to individual operating parameters contained in the operating data and by taking into account a plurality of operating parameters contained in the operating data. In particular, the operating data can be characterized by a traffic situation, weather conditions, a road surface composition or the operation of the vehicle in a driver assistance mode, for example with an activated speed control, so that the specified global operating strategy profile preferably depends on these operating parameters contained in the operational data.

A device 6 for specifying an operating strategy profile for the operation of a vehicle 5 is preferably configured to determine a local operating strategy profile on the basis of operating data that characterize an operating status and/or a driving situation of the vehicle 5 during its journey on the driving route. The local operating strategy profile is defined under consideration of local conditions and/or boundary conditions which affect the operation of the vehicle 5 on the route.

If the vehicle 5 transmits driving route data to the central database device 1 that characterize the route for which the vehicle fleet 4 has already transmitted operating data, the accordingly specified global operating strategy profile can be loaded from the memory device 2 and transferred back to the vehicle 5. In the device 6 for specifying an operating strategy profile for the operation of a vehicle 5, the global operating strategy profile transmitted is processed together with the specified local operating strategy profile, in particular a selection is made between the global and the local operating strategy profile or the local operating strategy profile is combined with the global, which results in an operating strategy profile to be applied. The operating strategy profile to be applied allows the best possible operating strategy to be applied at any point in time or on each section of the route. In particular, the on-board electrical system is controlled in a location-based and predictive manner. It may also be possible to activate or respectively to initiate or deactivate energy recuperation, load point displacements or electrical consumers, depending on location and predictively.

This is explained in more detail in the following example: Usually, a driver must release the gas pedal to activate energy recuperation. If the operating strategy profile to be applied is based at least partially on the global operating strategy profile however, according to which the vehicle should be operated in an energy saving manner, then if appropriate the recuperation can be initiated shortly before a slope, for example, regardless of the position of the gas pedal. Similarly, this can also be carried out if the operating strategy profile to be applied is based at least partly on the local operating strategy profile, according to which the vehicle is to be operated in a particularly energy-saving manner. This energy recuperation can also be initiated irrespective of the position of the accelerator pedal, for example if an existing traffic situation makes a deceleration of the vehicle necessary.

When an internal combustion engine is operated in overrun mode, the load point shifts towards a significantly higher efficiency. Depending on the operating strategy profile to be applied, if necessary all electrical consumers on the vehicle can be activated, in particular if the increase of the efficiency of the internal combustion engine compensates for the electrical energy demand of the consumers.

In this way, the vehicle can be operated particularly efficiently on the basis of the specified operating strategy profile to be applied, wherein for instance, the fuel consumption and $CO_2$ emissions can be reduced.

LIST OF REFERENCE NUMERALS 1 central database device
2 memory device
3 processing device
4 vehicle fleet
5 vehicle
6 device for specifying an operating strategy profile
100 method for specifying an operating strategy profile for the operation of a vehicle
200 method for specifying a global geo-referenced operating strategy profile with respect to a driving route
S1-S5 method steps
F1-F5 specification steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for specifying an operating strategy profile for operation of a vehicle, which is implementable in the vehicle, the method comprising the steps of:
    transmitting driving route data that characterize a scheduled driving route for an upcoming journey of the vehicle to a central database device;
    receiving operating strategy data from the central database device, which operating strategy data characterize a proposed geo-referenced global operating strategy profile defined with respect to an entirety of the driving route for the operation of the vehicle during its journey on the driving route;
    acquiring, via sensors, operating data, which characterize at least one of an operating status and a driving situation of the vehicle during its journey on the driving route, and determining a local operating strategy profile for the operation of the vehicle during its continued journey on the driving route on the basis of the acquired operating data;
    selecting between the global operating strategy profile and the local operating strategy profile as an operating strategy profile to be applied for the operation of the vehicle during its continued journey on the driving route; and
    applying the selected operating strategy profile for the operation of the vehicle on the driving route.

2. The method as claimed in claim 1, wherein the selected operating strategy profile is selected based on a selection criterion.

3. The method as claimed in claim 2, wherein the selection criterion is based on an optimization of one of the following or a combination of at least two of the following:
    energy consumption of the vehicle;
    power of the vehicle;
    comfort of vehicle occupants;
    vehicle safety; and
    a cost function into which the operating strategy data of the global operating strategy profile and the local operating strategy profile are entered.

4. The method as claimed in claim 2, wherein the operating strategy profile to be applied is adjusted using at least one predetermined route-independent operating strategy limit.

5. The method as claimed in claim 2, wherein the selection criterion is based on an optimization of energy consumption of the vehicle, power of the vehicle, and at least one of the following:
    comfort of vehicle occupants;
    vehicle safety; and
    a cost function into which the operating strategy data of the global operating strategy profile and the local operating strategy profile are entered.

6. The method as claimed in claim 1, wherein the operating strategy profile to be applied is specified by combination of the global with the local operating strategy profile using one of the following procedures or a combination of at least two of the following:
    averaging of operating strategy data of the global and local operating strategy profile;
    section-by-section selection of either the global or local operating strategy profile for a particular section of the operating strategy profile; and
    adapting, in particular limiting, the global operating strategy profile on the basis of the local operating strategy profile.

7. The method as claimed in claim 1, wherein an energy management of one or more electrical consumers on the vehicle is performed in accordance with the operating strategy profile to be applied.

8. The method as claimed in claim 1, wherein the operating strategy data that characterize the applied operating strategy profile are transmitted to the central database device along with a position of the vehicle.

9. The method as claimed in claim 1, wherein the selected operating strategy profile is applied based on an average of operating strategy data of the global operating strategy profile and the local operating strategy profile.

10. A device for specifying an operating strategy profile for operation of a vehicle, comprising:
    a control device in the vehicle, which control device is configured to execute a process of:
    transmitting driving route data that characterize a scheduled driving route for an upcoming journey of the vehicle to a central database device;
    receiving operating strategy data from the central database device, which operating strategy data characterize a proposed geo-referenced global operating strategy profile defined with respect to an entirety of the driving route for the operation of the vehicle during its journey on the driving route;
    acquiring, via sensors, operating data, which characterize at least one of an operating status and a driving situation of the vehicle during its journey on the driving route, and determining a local operating strategy profile for the operation of the vehicle during its continued journey on the driving route on the basis of the acquired operating data;

selecting between the global operating strategy profile and the local operating strategy profile as an operating strategy profile to be applied for the operation of the vehicle during its continued journey on the driving route; and applying the selected operating strategy profile for the operation of the vehicle on the driving route.

11. A motor vehicle, comprising a control device as claimed in claim 10.

12. A method for specifying a global geo-referenced operating strategy profile with respect to a driving route, the method comprising the steps of:

receiving, from a vehicle, (i) positions of the vehicle along a driving route driven by the vehicle or driving route data that characterize the route driven by the vehicle, and one or both of (ii) operating data that characterize an operating status of the vehicle or a driving situation during its journey on the driving route, and (iii) operating strategy data that characterize an operating strategy profile of the vehicle applied during its journey on the driving route, from a central database;

specifying a global operating strategy profile for an entirety of the driving route on the basis of the received positions of the vehicle or of the route data, and at least one of the operating data and the operating strategy data;

receiving, from at least one additional vehicle, driving route data that characterize the route driven by the vehicle;

transmitting the specified global operating strategy profile to the at least one additional vehicle, iteratively executing the method, by virtue of at least one of operating data that characterize an operating status of the at least one additional vehicle or a driving situation during the journey of the at least one additional vehicle on the driving route, operating strategy data that characterize an operating strategy profile of the at least one other vehicle applied during its journey on the driving route, being received from the central database device and by the global operating strategy profile for this route being specified afresh on the basis of the operating data, and the operating strategy data for the route being driven as well as the previously identified global operating strategy.

13. The method as claimed in claim 12, wherein the specified global operating strategy profile is stored as a component of an electronic navigation map.

14. The method as claimed in claim 12, wherein at least one of the received operating data and the operating strategy data contain a parameter that characterizes a vehicle class of the transmitting vehicle, and the global operating strategy profile is specified depending on the vehicle class.

15. The method as claimed in claim 12, wherein in the iterative execution of the method, differences between at least one of an operating strategy profile that is obtained from the received operating data of the additional vehicle and the operating strategy profile applied on the one hand, and the previously specified global operating strategy profile on the other hand, are classified and the global operating strategy profile is specified under consideration of the classified differences.

16. A central database device, comprising a server with a database, which is configured to execute the process of:

receiving, from a vehicle, at least one of (i) positions of the vehicle along a driving route driven by the vehicle or driving route data that characterize the route driven by the vehicle, (ii) operating data that characterize an operating status of the vehicle or a driving situation during its journey on the driving route, and (iii) operating strategy data that characterize an operating strategy profile of the vehicle applied during its journey on the driving route, from a central database;

specifying a global operating strategy profile for this driving route on the basis of the received positions of the vehicle or of the route data and at least one of the operating data and the operating strategy data;

receiving, from at least one additional vehicle, driving route data that characterize the route driven by the vehicle;

transmitting the specified global operating strategy profile to the at least one additional vehicle, iteratively executing the method, by virtue of at least one of operating data that characterize an operating status of the at least one additional vehicle or a driving situation during the journey of the at least one additional vehicle on the driving route, and operating strategy data that characterize an operating strategy profile of the at least one other vehicle applied during its journey on the driving route, being received from the central database device and by the global operating strategy profile for this route being specified afresh on the basis of at least one of the operating data and the operating strategy data for the route being driven as well as the previously identified global operating strategy.

* * * * *